United States Patent Office 3,323,885
Patented June 6, 1967

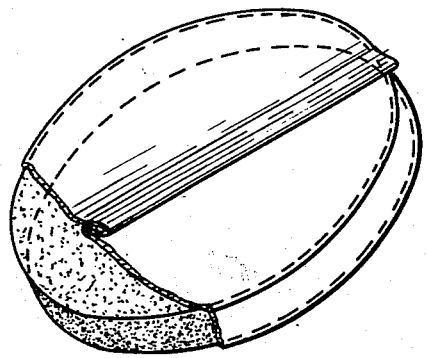
Fig. 2
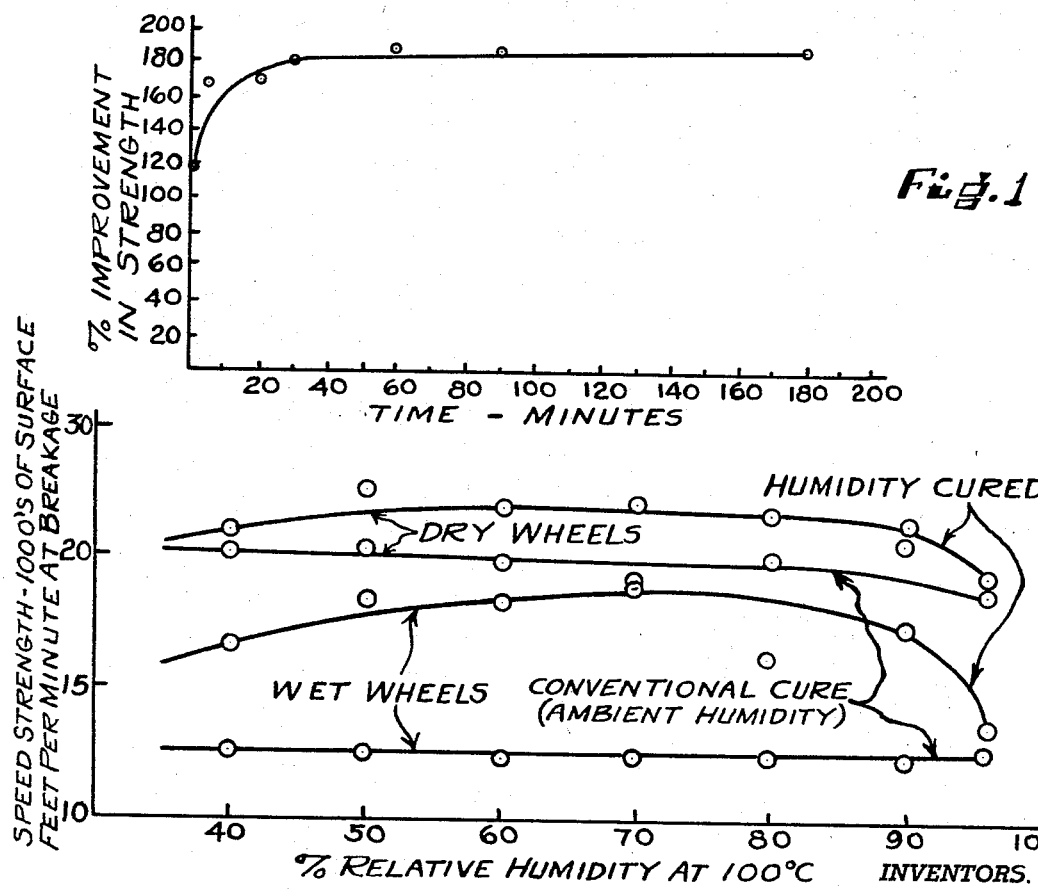
Fig. 1
Fig. 3
INVENTORS.
ROBERT A. ROWSE
ARTHUR A. LOISELLE Jr.
BY *Rufus M. Franklin*
ATTORNEY

3,323,885
HUMIDITY CONTROLLED PHENOL FORMALDEHYDE RESIN BONDED ABRASIVES
Robert A. Rowse, Shrewsbury, and Arthur A. Loiselle, Jr., Worcester, Mass., assignors to Norton Company, Worcester, Mass., a corporation of Massachusetts
Filed Feb. 8, 1963, Ser. No. 257,266
10 Claims. (Cl. 51—293)

This application is a continuation-in-part of Ser. No. 831,572, filed Aug. 4, 1959, now abandoned.

This invention relates to grinding wheels and a method of producing such wheels. More particularly it is concerned with improved resin bonded grinding wheels that have a stronger and more stable structure, more uniform bonding throughout, and for any given mixture, a greater relative hardness than known wheels. The invention is also concerned with a novel procedure which is practiced in a certain aspect of the control of the resin curing reaction.

Resin bonded grinding wheels are well known today and the constituents thereof such as abrasive grains are usually mixed with a resin bonding material which may be cured in a well known manner. As is well-known in the art, a typical one-stage resin commercially available is Union Carbide BRP-2821; a typical two-stage resin is Union Carbide BRP-5417 or 5980. The grain and resin ingredients are thoroughly blended and then pressed at room temperature to form a green wheel. The green wheel is thereafter baked in an oven wherein the temperature is maintained typically at about 175° C., the wheel being held in the oven usually for a period of from 12 to 24 hours in order to polymerize the resin bond.

Such wheels produced by following the prior art teachings are frequently characterized in that one side is less resistant to impact abrasion or may be referred to as softer than the other when subjected to a sandblast test wherein a measured volume of sand is directed against a given area of the wheel by a controlled air pressure. Another determination of the characteristics of resin bonded wheels may be made in a test wherein the wheel is soaked in water at room temperature for a period of 10 days or so and then subjected to the sandblast test. It has been found that the softer side of the conventional wheels becomes even softer relative to the harder side after such a period of soaking in water. But more importantly the soaking procedure also may be used in a test adapted to demonstrate the strength of the wheel against bursting by running it to destruction, in which test the wheel is made to fly apart due to the centrifugal forces imposed upon it as its speed of rotation is slowly increased. Data derived from the above described tests will be tabulated below to show a comparison of certain of the characteristics of convention wheel structures with those of our improved wheels and to show the relative comparison between certain of the characteristics of different wheels produced in accordance with our invention.

In following the conventional resin bonding practice for producing various products including grinding wheels, it has been thought that the presence of moisture or other volatile components in the mixture was undesirable. Such materials have generally been held as low as possible in grinding wheel raw batch mixtures or subjected to some manner of control such as immediate absorption during the curing cycle by a suitable substance dispersed throughout the batch. Heretofore it has been thought that if moisture or other volatile substances are allowed to volatilize in an uncontrolled manner while the wheel is being heated during curing of the resin, they will produce swelling and cracking.

We have discovered, however, that a superior resin bonded grinding wheel is produced by positively insuring the presence of moisture during the heating of a pressed shape made from the mixture of an abrasive and a phenol formaldehyde resin, the compacted shape being permeable to the volatiles initially produced, and the moisture being present and volatilized at least during the initial stages of the resin curing process. In following our practice moisture must be made available throughout the mass of the compacted shape as the green product is being heated from room temperature through the initial stages of the phenol formaldehyde maturing reaction, contrary to past teachings. When the moisture is rendered volatile in a somewhat porous structure it does not produce swelling or cracking of the compacted shaped and quite unexpectedly, it has been found that the presence of moisture rather than being detrimental under these conditions actually promotes a better resin curing reaction whereby a stronger wheel is produced, one that is more uniform in strength from side to side and one that has greater strength after being soaked in water for long periods of time as determined both by the sandblast test and the centrifugal bursting test.

A more detailed description of our invention follows.

In the drawings:

FIGURE 1 shows a graph explanative of one aspect of our invention;

FIGURE 2 shows a graph explanative of another aspect of the invention; and

FIGURE 3 shows a green wheel wrapped, illustrating one method of obtaining the advantages of our method.

We cannot fully develop the theory of the reaction or basic reasons why our technique works, but we have found that the presence of water during the curing of a mixture of an abrasive and a phenol-formaldehyde resin produces, in certain resin bonded wheels, improved characteristics in a wheel so cured over any wheels known heretofore. This improvement due to curing in the presence of water, has been found to be particularly pronounced in the case of the softer grade of wheels.

It is speculated that the ability to cause the powdered resin to flow around and develop contact with the abrasive particles is enhanced by the provision of the humidity control during at least a portion of the cure. Such control, as taught in this invention, reduces the rate of escape of moisture from the resin and thus increases the plasticity of the mix permitting the resin to continue flowing into more intimate contact with the abrasive before it becomes thermoset.

Experimental evidence also indicates that moisture, when its escape from the reacting mix is retarded, as in the invention herein taught, promotes the curing reaction, apparently having a catalytic effect on the cure.

A typical wheel incorporating our invention may be made, for example, of a two stage phenol-formaldehyde resin and abrasive mixture cured in the presence of moisture. The water may be provided in the wheel mixture and by evaporation from an open receptacle in a closed oven, and is present and available throughout the mass of the wheel during an initial heating step wherein the wheel temperature is raised from room temperature to about 100° C., where it is held soaking in the moistened atmosphere for a period of from five minutes to one hour or more, after which the open water receptacle is removed and the bake is completed without moisture control. It is believed that the moisture present during initial period of the bake under such conditions assists the first stage of the polymerization reaction wherein the resin apparently passes through a thermoplastic stage. When the final stage of the maturing action takes place, polymerization may continue in the absence of moisture, the bond being completed by the usual irreversible thermosetting reaction.

The practice here taught results in a superior phenol-formaldehyde resin bonded grinding wheel. It has been noted that when a wheel is made in following our teaching, the bond is always found to have a shiny appearance on all of the wheel surfaces and even internally in the wheel or the resin lining the pores within the wheel. This is in contrast with the somewhat dull surface characteristic of the bond often found in a wheel produced when following the prior art methods.

A similar improvement in the phenol-formaldehyde curing action takes place even in the situation where a single stage thermosetting resin is employed. The controlled presence of moisture during the initial phases of the maturing process results in a wheel having superior characteristics as stated above.

In following this teaching adequate moisture from the various sources available during the processing must be present when the initial phase of the resin curing reaction takes place, and preferably in an amount at least equal to about 5% by weight of those resin and curing ingredients taking part in the polymerization reaction. However, we have noted appreciable improvement when as little as 1% moisture was present. This may be accomplished by obtaining water in the green wheel structure from water added to the mix or present in the ingredients of the mix, or liberated by chemical reaction, and controlling its diffusion from the wheel structure during the initial stage of the cure by surrounding the wheel with moist air.

An effective procedure is to provide a blend of abrasive and phenol-formaldehyde resin which includes a component adapted to release the desired moisture required. Thus in the case of a phenol-formaldehyde two stage resin, furfural may be used which may contain as much as 5% free water and also, the furfural reacting during the maturing process to release one mole of water for each mole of furfural used, or 18.75% by weight of the pure furfural which water is available during the initial curing stage. If this is to be the entire source of the moisture, it is essential that the green wheel be surrounded in such a way as to retain a sufficient quantity of moisture in the wheel during the initial stages of the resin curing process to obtain the improved reaction here taught. Other ingredients of this water-liberating type which can be blended in with the mix are inorganic hydrates or salts that eliminate water of hydration or of crystallization when heated somewhat or other non-reactive compounds that split off water within the temperature range of the initial phase of the resin cure.

In other instances a liquid one stage resin containing about 2% water may be mixed with a two stage resin to provide the required moisture in the initial stages of the curing process. In addition the one stage resin will generate another 15% to 20% by weight of water as it polymerizes. Exact amounts of water will depend upon the details of manufacture of the particular liquid resin used. We have found that water freed by reaction below 110° C. is equivalent to free water in its function in our invention. One stage powdered resin contains an insignificant amount of free water, but generates some water as it polymerizes, which is less than that generated in the case of the liquid one stage resin. A two stage resin generates no free water as it polymerizes when hexamethylene tetramine is employed as the curing agent.

It is suggested that as another alternative, water may be added directly to the mixture as it is being formulated in the production of the green wheel. In each of these procedures it will be necessary to provide an environment around the green wheels in a manner to retain the moisture.

In practicing the present invention, it is essential that the humidity conditions surrounding the wheel be controlled during at least a portion of the cure. One method of indirect control found useful is the wrapping of the wheel with a moisture impermeable film as hereinafter referred to. The film is so applied that no significant build-up of pressure above atmospheric is produced within the wrapping. In the case of wrapped wheels, the water originally present in the wheel mix is in most cases sufficient to completely saturate the restricted atmosphere surrounding the wheel when subjected to a temperature of 100° C.

Instead of wrapping the individual wheels, a static saturated atmosphere may be provided by a vented container of sufficient volume to hold one or several wheels and including one or more containers of water within the container to insure saturation of the air. Wheels treated in such a chamber at about 100° C. during the initial stage of curing exhibit the improved properties made possible by the process of our invention.

Wheels may be entirely wrapped with aluminum foil as illustrated in FIGURE 3, or they may be placed on a moisture impermeable batt and covered on the top and sides with a moisture impermeable cover or membrane. Both of these techniques and equivalent techniques are considered "wrapping" as that term is used herein.

With respect to the temperature at which the humidity treatment takes place, obviously and as shown by our results any temperature within 5 or 10 degrees of the boiling point of water would be effective to produce the improved results of the invention whether practiced by wrapping the wheels or by some other method. Thus when used in the following claims "about 100° C." is intended to define such a range.

The present invention can also be practiced by a direct control of humidity in an air-conditioned oven, in which, at 100° C. the humidity is held for a specified time at a value between about 20% and about 90%. The wheels, containing at least 1% water (free or produced by the reaction), are held at 100° in the conditioned oven for at least a five minute soak and preferably for from 5 to 60 minutes. The wheels may be preheated to 100° C. in a conventional oven or may be brought up to temperature in the humidity controlled oven. In the latter case the humidity should be kept relatively low initially, while the wheels are still relatively cool, so as to prevent condensation of moisture and/or moisture migration from the atmosphere into the wheel. Such transfer of moisture from the atmosphere into the water containing wheels tends to offset the advantages of the humidity control as shown by the dropping off of the curves of FIGURE 2 at humidity values above 90%. At such extremely high humidity, in a circulating air oven, it is probable that moisture is absorbed from the atmosphere into the wheels. Thus, although humidities at or approaching 100% static atmospheres surrounding a wheel are not detrimental, such high humidity is not desirable in the case of a humidity controlled oven in which the atmosphere is circulated.

The conditions required in practicing the present invention are graphically presented in the drawing in FIGURES 2 and 3.

FIGURE 2 shows the effect of soak time at 100° C. and 65% relative humidity on the bursting strength of the wheels as compared to wheels cured in the conventional manner. As can be seen from the graph, even a two minute soak is advantageous, but the maximum advantage is gained somewhere between 20 and 60 minutes with even a 5 minute soak giving almost the full improvement. The preferred minimum soak time for the invention is therefore five minutes.

FIGURE 3 shows the relation between humidity, in a humidity controlled circulating air oven at 100° C., and strength of the product, other variables remaining constant. In this case, the speed strength, i.e. the surface speed in feet per minute at which breakage of the wheel occurs was plotted against the percent relative humidity. The speed strength for both dry wheels and wheels which have been weakened by soaking in water are compared against similarly treated conventionally cured wheels of the same composition. The results clearly show a significant improvement at 20% relative humidity with the preferred range of humidity being between 40 and 90% and optimum results for these particular wheels at about 65% relative humidity. The plot also shows the dropping off of improvement, possibly due to bloating, at humidities much above 90%. At such humidities diffusion of water vapor from the atmosphere into the wheels apparently accounts for the lower strength. Surprisingly, this effect does not occur in a static atmosphere.

With certain modified types of phenol-formaldehyde resins an initial curing reaction may proceed at a somewhat higher temperature than 100° C. The presence of moisture during the curing of certain of these higher temperature reacting resins will likewise produce improved results.

The invention here disclosed is adapted to improving the characteristics of grinding wheels bonded by phenol-formaldehyde resins. It is particularly useful in connection with the curing of such wheels having some degree of permeability wherein the moisture can be distributed throughout the interior of the product being cured during the initial phases of the process practiced for curing the resin. Within the contemplation of this invention a permeable wheel is one having a measure of continuous open and interconnecting pores which in the case of thick wheels can be in the order of at least about 5% of the bulk volume of the wheel. Such porosity can be measured by the vacuum impregnation of the wheel with a material of known density that is quite fluid at slightly elevated temperature but which is solid at room temperature, such as sulfur or paraffin. The open and interconnecting pore system permits water vapor to escape without disturbing the wheel structure but permits the water to be present in the wheel during the initial phase of the polymerization reaction. For thinner wheels, wherein the wheel thickness may approach the thickness dimension of the bond posts present, there is obviously no necessity to specify a minimum volume percent of open pores.

The invention has been found to be useful in association with two stage curing resins with various types of curing agents as well as one stage resins, and in each case, moisture is made available to promote the curing reaction at the initial phase of maturing. In combination with such resins abrasive grains are of course present and other conventional wheel filler and plasticizer constituents may be present including inorganic or organic compounds.

The following are examples of ways in which our invention may be adapted to practical applications and the data show comparisons in some of the examples with similar characteristics of wheels produced in following the conventional practice prior to our invention:

EXAMPLE I

In a rotary pan mixer with plows, we prepared a 10-pound mix having the following composition.

| Constituent: | Parts by wt. |
|---|---|
| 46 grit aluminum oxide abrasive | 91.70 |
| Powdered 2 stage resin containing hexamethylene tetramine as the curing agent | 6.64 |
| Liquid phenol-formaldehyde one-stage resin | 1.66 |

From this mix we pressed four wheels with molded dimensions of 5⅛" x 1" x 1", each comprised of 1.54 pounds of the aforementioned abrasive-resin mix. Three of these wheels were cured in three glass chambers containing static atmospheres of known and controlled absolute humidities generated within the chambers, which in turn were placed in a box oven. By "absolute humidity" we mean the moisture content of the air expressed in milligrams of water per liter of air usually calculated in our work at a room temperature assumed to be 28° C. and at a maximum temperature of 100° C. The desired moisture levels were maintained by placing open beakers of saturated aqueous solutions of inorganic salts within the chambers.

According to well-known principles of vapor pressure relationships over saturated aqueous salt solutions, the following salts give the indicated humidities at 100° C. These salts were used to provide the desired moisture levels in three different chambers.

HUMIDITY AT 100° C.

| Inorganic Salt | Absolute (mg. water vapor per liter atm.) | Relative, percent |
|---|---|---|
| KF | 136 | 22.9 |
| KI | 334 | 56.2 |
| Pb(NO$_3$)$_2$ | 530 | 89 |

Beakers of one of the saturated salt solutions were placed in each chamber and then one of the wheels was placed in each chamber. The wheels were allowed to remain in these static humid atmospheres for approximately the first six hours of the curing cycle, with the temperature of the wheels above 85° C. for about 3½ hours, until the oven temperature had reached 115° C. and the temperature of the wheels was about 107° C. Under this particular time and temperature schedule the desired initial phase reaction was considered to be substantially complete in the Example I wheels. The covers of the chambers were then removed, and the baking cycle was completed with the three wheels exposed to the rapid forced-air circulation of the oven for a period of about 22 hours during which time the oven temperature was raised to and maintained at 175° C. The air in the oven was heated room air, and as such it could have a maximum possible absolute humidity of 27 mg. H$_2$O/liter atmosphere at room temperature of 28° C., 100% relative humidity.

The first wheel in the data chart which follows, was exposed to the circulating air of the oven for the entire cure cycle.

After curing the four baked wheels were tested for sandblast and modulus of elasticity properties. Modulus of elasticity is measured by a musical pitch method and represents the stiffness of the wheels. The wheels were then immersed in water at room temperature for seven days, after which they were again sandblasted while still wet. The results are shown in Table I.

TABLE I

| Wheel No. | Absolute Humidity (mg. water vapor per liter at 100° C. | Air Circulation During Cure | | Modulus of Elasticity (dynes×10$^{-10}$ per cm.$^2$) | Sandblast Penetration (mm.) | | | |
|---|---|---|---|---|---|---|---|---|
| | | Below 115° C. | Above 115° C. | | Dry | | Soaked (7 days Tested Wet) | |
| | | | | | Top | Bottom | Top | Bottom |
| 1 | 22 (max.) (room air) | Rapid | Rapid | 13 | 3.86 | 2.36 | 6.68 | 4.42 |
| 2 | 136—KF solution | None | do | 14 | 2.28 | 1.94 | 4.04 | 3.70 |
| 3 | 334—KI solution | do | do | 14.5 | 1.85 | 1.85 | 3.22 | 3.80 |
| 4 | 530—Pb(NO$_3$)$_2$ solution | do | do | 15 | 1.73 | 1.66 | 2.90 | 2.90 |

These data show that wheels cured according to the process of this invention are more rigid (higher modulus) and harder by sandblast measurements than conventionally cured wheels. The difference was even greater after soaking. There was a marked increase in uniformity from top to bottom of the wheels, as set in the oven, with increasingly greater concentrations of moisture in the atmosphere. An increased quantity of moisture in the atmosphere about the wheels during the early stage of the cure cycle resulted in wheels with markedly improved strength and uniformity of bonding.

EXAMPLE II

A series of 12″ x 1″ x 4″ and 20″ x 4″ x 12″ wheels representing soft, medium, and hard wheels were pressed at room temperature in the conventional manner. The mixes all contained the same ingredients differing from one another only in the relative amounts of each of these ingredients. The medium wheels were made according to the following formula:

Aluminum oxide, 60 grit _____wt. percent__ 88.0
Powdered two-stage phenolic resin (hexamethylene tertamine as curing agent) _____do____ 10.2
Liquid one-stage phenolic resin _____do____ 1.8
Neutral anthracene oil ___cc./lb. powdered resin___ 30

One series of the soft, medium, and hard wheel was set open on supporting batts in the conventional manner and cured in a circulating oven at 175° C. maximum temperature of oven and wheel, the moisture being freely evaporated and thus removed from the wheel as it was produced during heating.

The second series of soft, medium, and hard wheels was closely confined by wrapping in aluminum foil and cured in the same circulating oven as were the first series of wheels to a 175° C. maximum temperature of oven and wheel. However, the foil wrapper was impervious to moisture and effectively sealed it in so that moisture was present during the initial phase of the resin curing action, yet the seal was not so tight as to retain any significant pressure.

*Results*

Speed strength: The following strengths were obtained by breaking the 12″ x 1″ x 4″ wheels in a speed testing machine both dry and tested wet after immersion in water for 10 days at room temperature:

TABLE II

| Wheel Hardness | Setting | Dry Strength (s.f.p.m.) | Wet Strength Tested Wet (s.f.p.m.) |
|---|---|---|---|
| Soft | Set open | 19,000 | 16,100 |
| | Humid enclosure | 20,200 | 18,000 |
| Medium | Set open | 21,000 | 18,900 |
| | Humid enclosure | 21,400 | 20,400 |
| Hard | Set open | 22,600 | 20,800 |
| | Humid enclosure | 22,700 | 22,200 |

The speed tests show uniformly that the invention wheels were stronger than the comparison wheels, especially when tested in the wet condition.

The larger wheels of Example II were subjected to a grinding test designed to simulate normal usage. The test conditions were as follows:

Wheel size _____ 20″ x 4″ x 12″.
Machine_____ No. 2 Cincinnati centerless.
Wheel speed_____ 6500 s.f.p.m.
Motor H.P. _____ 20.
Material _____ 52,100 hardened steel, $R_c$ 58, 5 x 0.560 dia.
Stock removal _____ 32 mils total (consisting of consecutive passes of 20 mils, 10 mils, 2 mils).
No. pieces ground ___ 100 per wheel.
Coolant _____ Water and White & Bagley #1500 (40:1) (the additive being a water soluble oil composition).

*Grinding results*

The following grinding results were obtained:

| Grade of Wheel Hardness | Setting | Total Wheel Wear in Grinding 100 Pieces. (Mils wear on the wheel diameter) |
|---|---|---|
| Soft | Set open | .355 |
| | Humid enclosure | .263 |
| Medium | Set open | .124 |
| | Humid enclosure | .097 |
| Hard | Set open | .075 |
| | Humid enclosure | .069 |

These results show that all of the invention wheels showed much less wear for the same amount of stock removal as compared with the conventional wheels.

EXAMPLE III

Medium hard 12″ x 1″ x 4″ wheels were made from mix according to the following formula:

Aluminum oxide, 60 grit _____wt. percent__ 86.9.
Powdered two-stage phenolic resin (with hexamethylene tetramine as curing agent) __wt. percent__ 9.9.
Powdered cryolite _____do____ 2.8.
Powdered CaO _____do____ 0.4.
Furfural _____ 60 cc./lb. dry resin.
Neutral anthracene oil _____ 45 cc./lb. dry resin.

Six wheels were set open on a supporting batt and cured in the conventional manner in a circulating oven at a 175° C. maximum temperature of oven and wheel.

Five identical wheels were closely confined by wrapping in moisture-impervious aluminum foil and were otherwise cured in the conventional manner.

*Results*

The following strengths were obtained by breaking the completed 12″ x 1″ x 4″ wheels in a speed testing machine both dry and tested wet after immersion in water for 10 days at room temperature:

TABLE III

| Wheel Setting | Dry Strength (s.f.p.m.) | Wet Strength When tested wet (s.f.p.m.) |
|---|---|---|
| Open during cure | 23,500 | 16,500 |
| Humid enclosure during cure | 24,500 | 21,500 |

It will be noted that in formulation above for medium hard wheels the quantity of lime used did not interfere with the successful practice of our invention.

EXAMPLE IV

The importance of moisture in the wheel bond and retention of said moisture became more evident in comparison with the prior art when wheels were made bonded with dry two-stage phenol-formaldehyde resin, as compared to two-stage phenolic with 20% liquid one-stage phenol-formaldehyde resin, which generated $H_2O$, or compared with two-stage phenolic with 18% distilled water added.

We prepared three five-pound mixes designated A, B, and C with the following compositions:

| Mix | Parts by Weight | | | |
|---|---|---|---|---|
| | 46 grit $Al_2O_3$ | Two-stage phenol formaldehyde resin with hexa | One-stage liquid phenol formaldehyde resin | Distilled Water |
| A | 91.70 | 8.30 | None | None |
| B | 91.70 | 6.64 | 1.66 | None |
| C | 91.70 | 6.80 | None | 1.50 |

From each of the three mixes, A, B, and C, two 5⅛" x 1' x 1" wheels were pressed, each wheel comprised of 1.54 pounds of a given mix. One wheel of each mix was set open in a mechanically convected box-oven in the customary manner, and the other wheel of each mix was closely confined as in Example II, in order to retain the moisture in the bond. All wheels were cured to a maximum oven and wheel temperature of 175° C. according to the previously described baking procedure.

The effect on the final product of the presence or absence of moisture, and the effect of permitting escape of moisture vs. moisture retention is shown in the following tabulation:

EXAMPLE V

We prepared a 50-pound mix identical in composition to that described in Example I. From the mix we pressed 28 wheels with 5⅛" x 1" x 1" molded dimensions. Of the 28 wheels pressed, a lot of seven designated A were set open in a box-oven, while the remaining 21 were closely confined by wrapping in aluminum foil to retain the moisture in the bond. The cure cycle was commenced. When the oven temperature had progressed from room temperature to 100° C. (wheel temperature 90° to 100° C.), the

TABLE IV

| Mix | Wheel No. | Wheel Bond | Setting Method | Modulus of Elasticity (dynes×10⁻¹⁰ per sq. cm.) | Sandblast Penetration (mm.) | | | |
|---|---|---|---|---|---|---|---|---|
| | | | | | Dry | | Soaked (7 days) Tested Wet | |
| | | | | | Top | Bottom | Top | Bottom |
| A | 1 | Dry 2-stage phenolic only | Set open in mechanically convected oven. | 8 | 5.38 | 5.68 | 5.96 | 5.92 |
| B | 1 | 2-stage phenolic plus 20% one-stage liquid phenolic. | ----do---- | 13 | 3.74 | 2.26 | 5.93 | 4.22 |
| C | 1 | 2-stage phenolic plus 18% distilled H₂O | ----do---- | 11 | 3.71 | 2.34 | 5.62 | 3.51 |
| A | 2 | Dry 2-stage phenolic only | Closely confined | 8 | 4.53 | 5.12 | 6.35 | 6.73 |
| B | 2 | 2-stage phenolic plus 20% one-stage liquid phenolic. | ----do---- | 15 | 1.66 | 1.45 | 2.68 | 2.64 |
| C | 2 | 2-stage phenolic plus 18% distilled H₂O | ----do---- | 15 | 1.95 | 1.70 | 2.86 | 2.58 |

Whether the moisture was added originally as liquid water or as liquid one-stage phenolic which generates water upon curing, the wheels were poor when cured in the customary manner, but were greatly improved if the moisture was retained by close confinement.

These above data on closely confined wheels compared with open set wheels show that moisture must be retained in the wheel during the cure and that confinement in the absence of moisture present or generated, is not successful.

hours (wheels two to three hours at 100° C.), the confinement was removed from another lot of seven wheels designated B and these were then set open for the rest of the cycle. After the oven temperature had been at 100° C. for three hours (wheels two to three hours at 100° C.), the confinement was removed from a lot of seven designated C and these allowed to continue the cure set open. The final lot of seven wheels designated D was closely confined for the full cure cycle.

One wheel from each of the four lots was sandblasted dry and later was sandblasted again while wet following a seven-day soak in water at room temperature. Three

TABLE V

| Wheel Lot | Wheel No. | Time and oven Temperature of Confinement | Modulus of Elasticity (dynes×10⁻¹⁰ per cm.²) | Sandblast Penetration (mm.) | | | | Speed Test to Destruction (s.f.p.m.) | |
|---|---|---|---|---|---|---|---|---|---|
| | | | | Dry | | Soaked (7 days) Tested Wet | | | Soaked (10 days) Tested Wet |
| | | | | Top | Bottom | Top | Bottom | Dry | |
| A | 1 | Not confined | 12.4 | 3.52 | 2.47 | 5.41 | 3.68 | | |
| A | 2 | | | | | | | 16,700 | 10,500 |
| A | 3 | | | | | | | 17,100 | |
| A | 4 | | | | | | | | 10,500 |
| A | 5 | | | | | | | 17,100 | |
| A | 6 | | | | | | | | 10,500 |
| A | 7 | | | | | | | ¹ 17,000 | ¹ 10,500 |
| B | 1 | Confined 2 hr., room temperature to 100° C. | 13.3 | 2.76 | 2.22 | 4.14 | 2.95 | | |
| B | 2 | | | | | | | 17,700 | |
| B | 3 | | | | | | | | 11,800 |
| B | 4 | | | | | | | 17,900 | |
| B | 5 | | | | | | | | 11,500 |
| B | 6 | | | | | | | 17,500 | |
| B | 7 | | | | | | | | 11,900 |
| | | | | | | | | ¹ 17,700 | ¹ 11,700 |
| C | 1 | Confined 2 hr., room temperature to 100° C. and 3 hr. at 100° C. | 15.8 | 1.68 | 1.82 | 2.35 | 2.72 | | |
| C | 2 | | | | | | | 19,600 | |
| C | 3 | | | | | | | | 14,500 |
| C | 4 | | | | | | | 19,000 | |
| C | 5 | | | | | | | | 15,000 |
| C | 6 | | | | | | | 19,500 | |
| C | 7 | | | | | | | | 14,700 |
| | | | | | | | | ¹ 19,400 | ¹ 14,700 |
| D | 1 | Confined 28 hr. to 175° C. | 15.7 | 1.64 | 1.66 | 2.20 | 2.29 | | |
| D | 2 | | | | | | | 18,400 | |
| D | 3 | | | | | | | | 14,900 |
| D | 4 | | | | | | | 18,200 | |
| D | 5 | | | | | | | | 14,900 |
| D | 6 | | | | | | | 19,600 | |
| D | 7 | | | | | | | | 14,800 |
| | | | | | | | | ¹ 19,100 | ¹ 14,900 |

¹ Average.

wheels of the remaining six of each lot were speed tested to destruction dry and the other three wheels of each lot were speed tested to restruction while wet following a 10-day soak in water at room temperature.

The change in wheel properties as affected by various intervals of confinement were as shown in Table V.

The data tabulated above showed that to obtain a substantially maximum improvement, retention of moisture in the bond was necessary only for the first five hours of the bake cycle during which the wheel is heated from room temperature to a temperature of approximately 100° C. Some slight improvement in hardness and uniformity is noted, however, by maintaining wrapping during the entire curing process.

Wheels bonded with one-stage phenol formaldehyde resin were improved as well as two-stage phenol formaldehyde bonded wheels by supply a moist atmosphere during the early part of the cure cycle with little apparent advantage as a consequence of prolonging the retention of a humid atmosphere beyond 115° C. oven temperature.

EXAMPLE VI

Although hexamethylene tetramine is the preferred curing agent for novolaks, which constitute the first stage of a two-stage resin, other curing agents are known, e.g., trioxane or paraformaldehyde.

We prepared 1.5 pounds of a two-stage phenol-formaldehyde resin by blending 0.21 pound of finely powdered paraformaldehyde with 1.29 pounds of powdered novolak. The mixture was tumbled for 24 hours which resulted in a uniform blend.

Using this novolak-paraformaldehyde blend as the abrasive bond, we pressed four wheels 5⅛" x 1" x 1" of the same specifications defined in Example I. Two of these wheels were cured set open in a mechanically convected box oven (absolute humidity max. of 22 mg./liter at 100° C.) in the customary manner of the art. The remaining two wheels were cured in a static atmosphere with an absolute humidity of 595 mg. $H_2O$ per liter of atmosphere, up to an oven temperature of 115° C. (wheel temperature 107° C.). When the oven temperature had attained 115° C., the humid atmosphere was removed and the wheels allowed to finish the cure cycle set open in the box oven.

The moduli and sandblast results are tabulated below:

TABLE VI

| Curing Environment | Wheel No. | Abs. Humidity 100° C. (mg. water vapor per liter of atm.) | Modulus of Elasticity (dynes×10⁻¹⁰ per cm.²) | Sandblast Penetration (mm.) | | | |
|---|---|---|---|---|---|---|---|
| | | | | Dry | | Soaked (7 days) Tested wet | |
| | | | | Top | Bottom | Top | Bottom |
| Conventional | 1 | 22 mg. (max.) | 14 | 3.02 | 2.22 | | |
| Do | 2 | | | | | 5.59 | 5.88 |
| Humid | 1 | 595 mg. | 14.5 | 1.96 | 2.00 | | |
| Do | 2 | | | | | 4.76 | 4.35 |

These data show that wheels exhibiting improved modulus of elasticity and sandblast properties resulted from wheels bonded with a paraformaldehyde-novolak two-stage resin by subjecting the wheels to a humid atmosphere up to 115° C. of the cure cycle.

EXAMPLE VII

Grinding tests were carried out using 20" x 3" x 12" wheels of three different relatively soft grades. Two wheels of each grade were made. We cured one wheel of each grade open in a mechanically convected box-oven and one wheel of each grade in a static atmosphere containing approximately 530 mg. of moisture per liter at 100° C. The wheels in the humid atmosphere were retained in that manner until the temperature of the oven reached 145° C. (wheel temperature 105° C.). The lag between wheel temperature and oven temperature in this example was because large wheels were being cured. At this point, the humid atmosphere was removed and the wheels allowed to complete the remainder of the cure cycle set open in the mechanically convected box-oven.

The results of the grinding tests are contained in Tables VII-A and VII-B. The wheels used had the following composition:

|  | Parts by wt. |
|---|---|
| 36 grit silicon carbide abrasive | 88.6 |
| Phenol-formaldehyde resin bond | 14.4 |

TABLE VII-A.—RESULTS OF CYLINDRICAL GRINDING TEST

| | |
|---|---|
| Wheel size | 20" x 3" x 12". |
| Machine | Norton 10 x 36 cylindrical grinder. |
| Wheel speed | 6200 s.f.p.m. |
| Motor H.P. | 15 H.P. |
| Work speed | 76 r.p.m. |
| Material | Chilled iron rolls, 6" dia. x 18" long, Scleroscope 60. |
| Stock removal | 120 mils total (24 passes at 5 mils per pass). |
| Coolant | Water with White & Bagley #1500 (80:1) (the additive being a water soluble oil composition). |

*Results*

| Setting Method | Wheel Wear on Diam. (mils) | Material Removed (mils) | Volume Grinding Ratio |
|---|---|---|---|
| Conventional (22 mg. $H_2O$ max. per liter at 100° C.) | 70.5 | 49.5 | 1.08 |
| Humid atmosphere (530 mg. $H_2O$ per liter at 100° C.) | 64.0 | 56.0 | 1.32 |

These data show that the invention wheels produce a greater quantity of stock removal while at the same time show less wear.

*Centerless grinding test*

Two grades of wheels designated as I and II, were utilized in this test. The compositions of the wheels were as follows:

(I)

|  | Parts by wt. |
|---|---|
| 60 grit aluminum oxide abrasive | 90.0 |
| Phenol-formaldehyde resin bond | 10.0 |

(II)

|  |  |
|---|---|
| 60 grit aluminum oxide | 88.0 |
| Phenol-formaldehyde resin bond | 12.0 |

TABLE VII-B.—RESULTS OF CENTERLESS GRINDING TEST

| | |
|---|---|
| Wheel size | 20" x 3" x 12". |
| Machine | No. 2 Cincinnati centerless grinder. |
| Wheel speed | 6500 s.f.p.m. |
| Motor H.P. | 20 H.P. |
| Material | 52100 hardened steel, $R_c$ 58, $2^{7}/_{32}$" O.D. x 5" long. |
| Stock removal | 17 mils total (roughing 10 mils, semi-finishing 5 mils, finishing 2 mils). |
| No. pieces ground | 230 pieces per wheel. |
| Coolant | Water with International #130 oil (40:1) (the additive being a water soluble oil composition. |

*Results*

| Setting Method | Grade | Wheel Wear on Diam. (mils) |
|---|---|---|
| Conventional (22 mg. $H_2O$ max. per liter at 100° C.) | I | 305 |
| Humid atmosphere (530 mg. $H_2O$ per liter at 100° C.) | I | 155 |
| Conventional (22 mg. $H_2O$ max. per liter at 100° C.) | II | 102 |
| Humid atmosphere (530 mg. $H_2O$ per liter at 100° C.) | II | 70 |

These data in Tables IX-A and IX-B show that for both cylindrical and centerless grinding, the wheels retained in the humid atmosphere for the early part of the cure cycle outperformed in all respects analogous wheels cured in the conventional manner.

EXAMPLE VIII

Nine 12" x .105" x 1" wheels, representing hard wheels, were cold pressed in the conventional manner. These wheels contained about 10% porosity and were made according to the following formula:

| | |
|---|---|
| Aluminum oxide 24 grit | wt. percent 72.8 |
| Powdered two-stage phenolic resin | do 10.3 |
| Liquid one-stage phenolic resin | do 3.4 |
| Powdered iron pyrites | do 13.5 |
| Neutral anthracene oil, 15 cc./lb. powdered resin. | |

Three wheels designated lot A were set on supporting batts and cured open in a circulating oven at a 175° C. maximum temperature of oven and wheel. Three wheels designated lot B were closely confined by wrapping in aluminum foil and cured in the same circulating oven as the first wheels. After the oven temperature had been at 100° C. for five hours, the wrapping was removed and the wheels were cured open to a 175° C. maximum temperature of oven and wheel. The remaining three wheels designated C were closely confined by wrapping in aluminum foil and cured throughout the entire bake at the same time in the same circulating oven as the above wheels.

*Results*

The wheels were broken in a speed testing machine in the dry condition with the following results:

TABLE VIII

| Lot No. | Wheel No. | Setting | Strengths (s.f.p.m.) | | |
|---|---|---|---|---|---|
| | | | Individual | Average | Maximum Variation |
| A | 1 | Set open | 20,700 | 24,500 | 6,900 |
| A | 2 | | 25,100 | | |
| A | 3 | | 27,600 | | |
| B | 1 | Enclosure removed after 5 hours oven temp. at 100° C. | 26,400 | 27,200 | 1,550 |
| B | 2 | | 27,300 | | |
| B | 3 | | 27,950 | | |
| C | 1 | Enclosed throughout cure | 26,700 | 27,200 | 1,250 |
| C | 2 | | 27,000 | | |
| C | 3 | | 27,950 | | |

EXAMPLE IX

We made six wheels, of a hard grade, having the following composition:

| | Wt. percent |
|---|---|
| Aluminum oxide 46 grit | 83.5 |
| Powdered 2 stage phenol-formaldehyde resin with hexamethylene tetramine curing agent | 15.8 |
| Liquid one stage | .7 |

Six wheels $5\frac{1}{8}$" x 1" x 1" were pressed in a conventional manner at room temperature and three wheels designated lot A were set open in a circulating oven. The other three wheels designated lot B were wrapped in aluminum foil and the six wheels were cured as in Example II.

TABLE IX

| Wheel Lot | Wheel No. | Sandblast Penetration (mm.) Dry | | Speed Strength | |
|---|---|---|---|---|---|
| | | Top | Bottom | Dry | Soaked 10 days, Tested Wet |
| A | 1 | 1.82 | 1.32 | | |
| A | 2 | | | 19,700 | |
| A | 3 | | | | 18,800 |
| B | 1 | 1.32 | 1.30 | | |
| B | 2 | | | 21,000+ | |
| B | 3 | | | | 21,000+ |

These data show that hard grade wheels cured wrapped in the presence of about 1% moisture developed from the liquid resin increased the wheel uniformity and speed strength significantly. In fact up to a surface speed of up to 21,000 s.f.p.m. which was the capacity of the speed testing machine, it was impossilbe to burst the moisture cured wheels.

EXAMPLE X

In a suitable mixer we prepared a bond for four wheels having the following bond composition:

| | Volume Percent | Weight Percent |
|---|---|---|
| Rubber and Sulfur | 40 | 34.8 |
| 2 stage phenol-formaldehyde resin with hexamethylene tetramine curing agent | 50 | 46.4 |
| Clay filler | 10 | 18.8 |

The bonding mixture was blended with 46 grit aluminum oxide abrasive in the proportion by weight of 86.1 abrasive and 13.9 bond to form a soft grade of wheel. Two wheels pressed from this mix were set open and two wheels were wrapped in aluminum foil for the entire cure cycle. These four wheels were baked for 10 hours at 100° C. during which period the temperature of the wheels was raised from room temperature to about 100° C. and then the oven temperature was raised to 160° C. for a period of 38 hours.

A comparison of the different wheels of this example is shown in Table X.

TABLE X

| Wheel No. | | Ave. Sandblast penetration (mm.) Dry Wheels | |
|---|---|---|---|
| | | Top | Bottom |
| 1 | Open | 2.20 | 1.95 |
| 2 | do | 2.21 | 2.00 |
| 3 | Wrapped | 1.62 | 1.64 |
| 4 | do | 1.72 | 1.61 |

These data show that a mixture of a rubber and phenol-formaldehyde resin to form a bond shows some improvement when the wheels produced therefrom are wrapped during the curing cycle and moisture is made available to the resin component of the bond. While the proportion of gain is not as great as with the bonds made up entirely of a resin composition, the facts do show that when some phenol-formaldehyde resin is mixed with a rubber blend to form a bond, some significant improvement is noted.

EXAMPLE XI

Another mixed bond was formed of phenol-formaldehyde resin and shellac. In this mix a bond composition in the following proportions was made up:

| | Wt. percent |
|---|---|
| Shellac | 91.5 |
| Liquid one stage phenol-formaldehyde resin | 8.5 | to which was added 266 cc. of castor oil per 10 pounds of the above mix.

This bond was mixed with 120 grit silicon carbide abrasive in the proportions of 84.9% by weight of abrasive and 15.1% by weight of bond. Two soft grade wheels were pressed from this mix, one being set open to cure and the other wrapped in aluminum foil. The two wheels were heated in an oven that was raised from room temperature to 100° C. over a period extending for 26 hours, and the oven temperature was then raised to 160° C. for an additional 8 hours.

The sandblast data recorded on the testing of these wheels is set forth below in Table XI.

TABLE XI

| Wheel No. | Set | Dry Wheels Sandblast penetration (mm.) | |
|---|---|---|---|
| | | Top | Bottom |
| 1 | Open | 4.24 | 3.56 |
| 2 | Wrapped | 3.48 | 3.56 |

These data show a considerable improvement in uniformity from top to bottom of the wheels as set in the oven. This is another example of a mixed bond made up of a phenol-formaldehyde resin and a shellac, wherein improvement was noted when the resin containing wheel was cured in a manner to make moisture available to the resin during the curing process.

The above are set forth as typical examples of the best mode we know of for adapting our invention to a practical use with certain known phenol-formaldehyde resins. New varieties of phenol-formaldehyde resins and modifications thereof are constantly being developed and made commercially available. It is, therefore, not only impossible to attempt to form a complete catalog of useful resins but also impossible to attempt to describe the invention in its broadest aspects in terms of chemical names. A chemist with a knowledge of the materials available will know or will be able to deduce with confidence the applicability of other known phenol-formaldehyde resin compositions and other mixed bonding ingredients to the purpose of the invention, or otherwise in the case of new or novel phenol-formaldehyde resin materials will be able to, through performance of routine tests not of an inventive nature, provide himself with reliable data to predict their utility for the purposes of this invention. It is suggested, therefore, that many modifications of this invention may occur to those skilled in the art which will fall within the scope of the following claims.

What is claimed is:

1. A method of manufacturing a permeable resin bonded abrasive article comprising forming a mixture of abrasive grains and an uncured phenol-formaldehyde resin, compacting and forming a given quantity of said mixture to the desired article shape, thereafter heating said compacted mixture to cure said resin, performing the initial stage of said curing process with moisture present throughout the mass of said article, said water being vaporized as the curing proceeds, and maintaining a relative humidity of at least 20% surrounding the article to insure the presence of adequate moisture in the mass for at least 5 minutes at about 100° C. at the start of the curing process.

2. A process for curing a phenol-formaldehyde bonded abrasive grinding wheel comprising subjecting the wheel, while in an uncured state, to a temperature of about 100° C. for at least 5 minutes and a relative humidity of at least 20%.

3. A process as in claim 2 in which the humidity treatment is carried out in a static atmosphere at a relative humidity of from 20 to 100%.

4. A process as in claim 2 in which the humidity treatment is carried out in a circulating atmosphere at a humidity between 20 and 90%.

5. A method as in claim 2 in which the uncured resin in the wheel includes a source of water, which water is in the amount of at least 1% by weight of uncured weight of the resin.

6. A method as in claim 2 in which the wheel, as cured, includes an open porosity of at least 5% by volume.

7. A grinding wheel made according to claim 2.

8. A method of manufacturing a resin bonded abrasive article having at least 5% by volume of open and interconnected pores comprising forming a mixture of a granular abrasive and a phenol-formaldehyde resin bond, said mixture including a supply of moisture in an amount equal to at least above 1% by weight of the resin, compacting and forming said mixture to the desired article shape, wrapping said article in a moisture impermeable membrane, said membrane being sufficiently loosely wrapped to permit relief of significant build-up of pressure within said wrapping, and curing said mixture to a thermoset condition, whereby an abrasive article is produced having substantially uniform hardness throughout as measured by impact abrasion.

9. A process for curing a grinding wheel including a bond of phenol-formaldehyde resin and rubber comprising subjecting the wheel, while in an uncured state, to a temperature of about 100° C. for at least 5 minutes and a relative humidity of at least 20%.

10. A process for curing a grinding wheel including a bond of phenol-formaldehyde resin and shellac comprising subjecting the wheel, while in an uncured state, to a temperature of about 100° C. for at least 5 minutes and a relative humidity of at least 20%.

References Cited

UNITED STATES PATENTS

| Re. 21,252 | 10/1939 | Kistler | 51—298 |
| 1,937,043 | 11/1933 | Martin | 51—298 |
| 2,061,931 | 11/1936 | Benner et al. | 51—298 |
| 2,223,392 | 12/1940 | Smith | 51—298 |
| 2,249,279 | 7/1941 | Kistler | 51—298 |

ALEXANDER H. BRODMERKEL, *Primary Examiner.*

D. J. ARNOLD, *Assistant Examiner.*